Feb. 16, 1960 C. H. CROSBY ET AL 2,924,930
APPARATUS FOR MAKING RANDOM UNIT LAY CABLE
Filed July 19, 1957 2 Sheets-Sheet 1
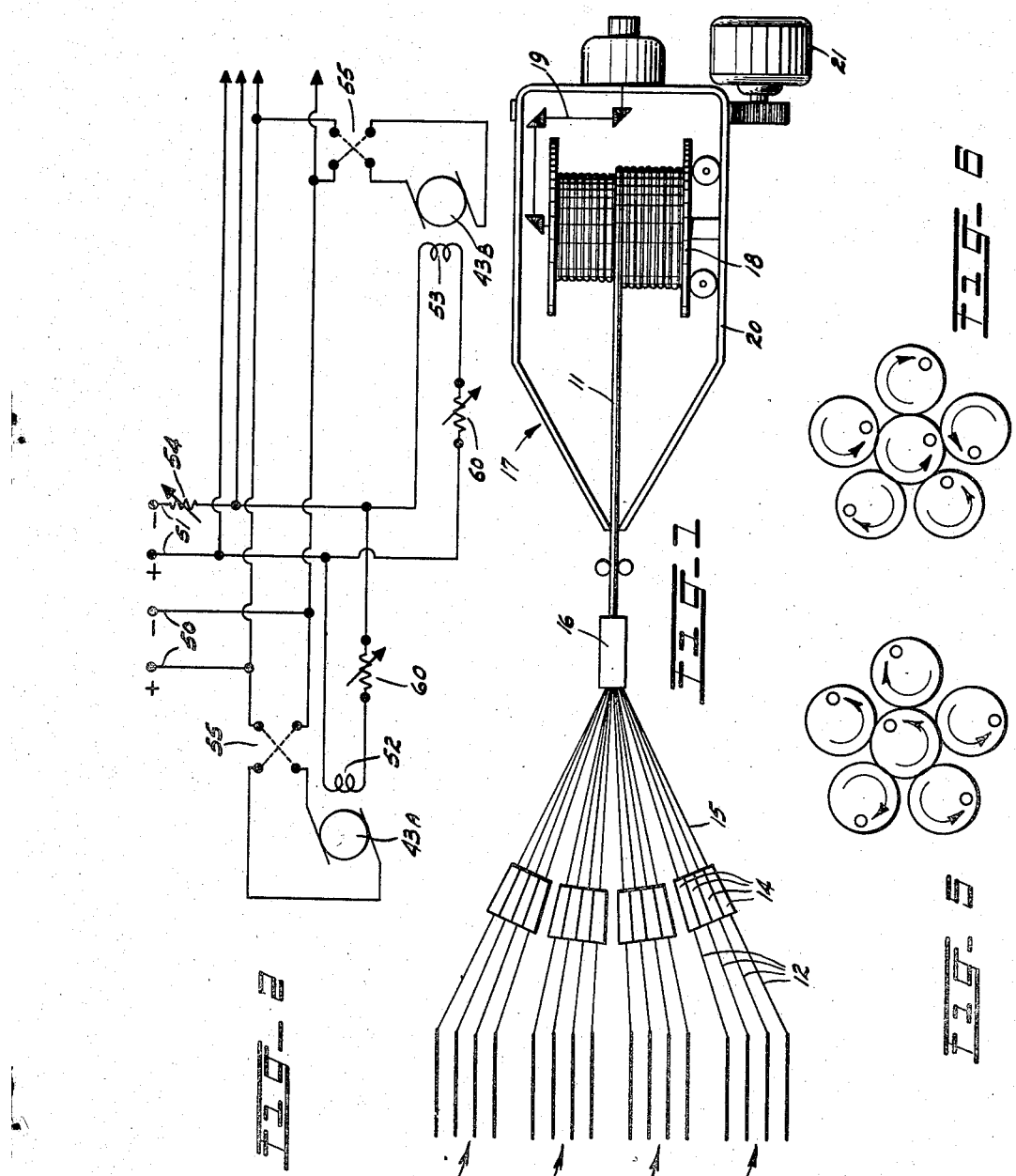
INVENTORS
C.H. CROSBY
W.T. HICKS
R.R. WAHLBERG
By
ATTORNEY Feb. 16, 1960　　C. H. CROSBY ET AL　　2,924,930
APPARATUS FOR MAKING RANDOM UNIT LAY CABLE
Filed July 19, 1957　　2 Sheets-Sheet 2
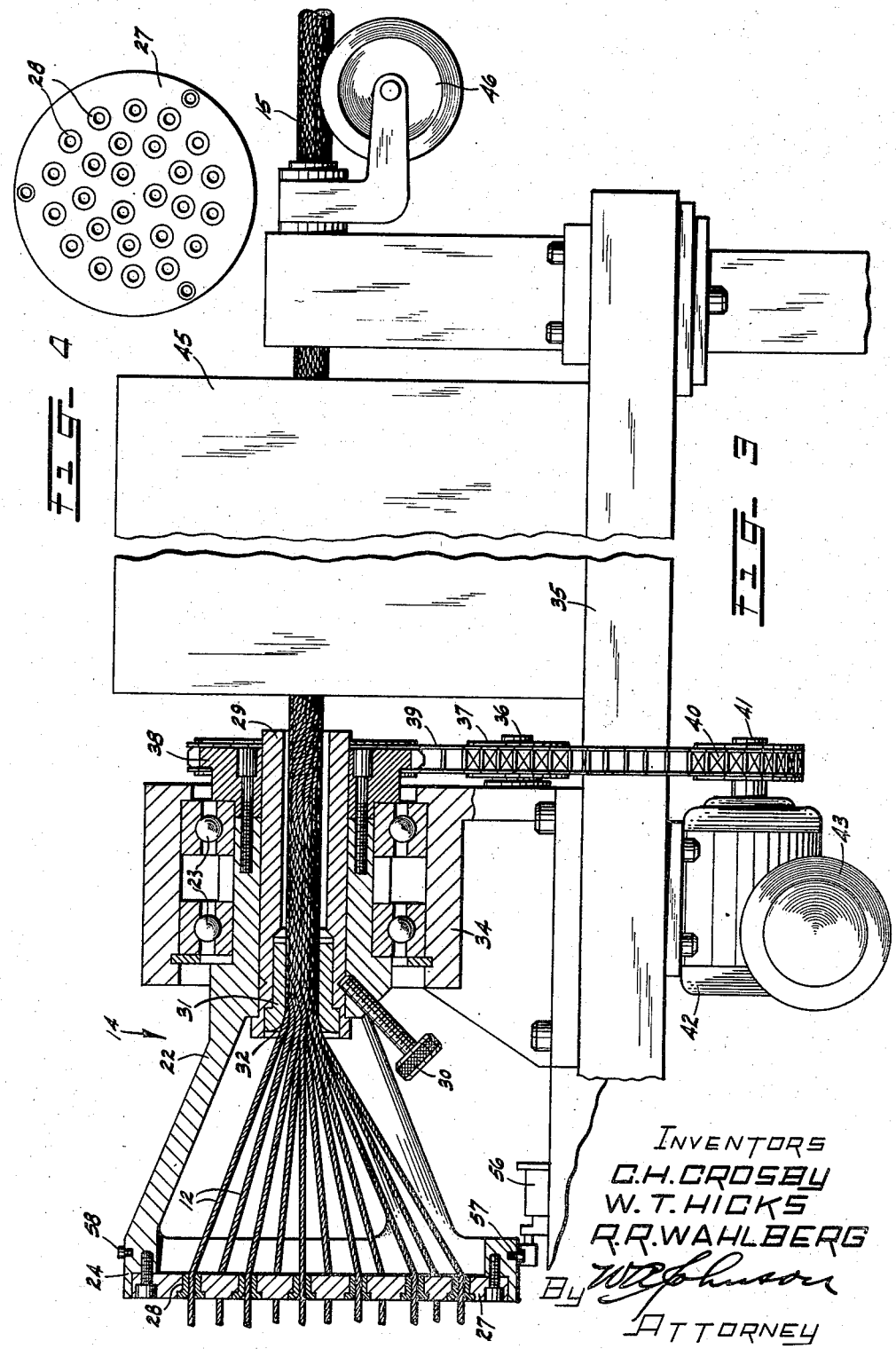
INVENTORS
C.H.CROSBY
W.T.HICKS
R.R.WAHLBERG
ATTORNEY

United States Patent Office 2,924,930
Patented Feb. 16, 1960

2,924,930

APPARATUS FOR MAKING RANDOM UNIT LAY CABLE

Charles H. Crosby, Cranford, William T. Hicks, Glen Rock, and Roger R. Wahlberg, Bloomfield, N.J., assignors to Western Electric Company, Incorporated, New York, N.Y., a corporation of New York Application July 19, 1957, Serial No. 672,890

3 Claims. (Cl. 57—51)

This invention relates to cables, particularly to telephone cables and apparatus for forming the same.

Early in the history of the manufacture of cable for use it became obvious, that for cable of any considerable length special precautions were required to prevent the voice currents in one pair of wires from inducing in adjacent wires similar currents which would give rise to the phenomena generally known as "cross-talk."

It is accordingly common practice as a first step to make twisted pairs of wires having different numbers of twists per unit length. These pairs of different twist lengths are then twisted together in groups to form complete cables or to form units which may be combined in various numbers to form so-called unit type cable. In preparing to make the cable, care must be taken to arrange the payoff from the supply reels so that pairs of the same twist length do not occupy adjacent positions in the completed cable.

In the case of unit cables the pairs are selected to insure that those in the outer layers in adjacent units are of different twist lengths since in the cabling operation the units of a conventional unit type cable tend to remain in the same relative orientation throughout the cable length. It therefore has been necessary to make up and keep in stock a number of differently composed types of units in order to be able to make a multi-unit cable which is satisfactory from the cross-talk standpoint.

The general object of this invention is to simplify the construction and reduce the cost of making telephone cables which have a low level cross-talk between the various circuits in the cable.

According to the general features of the invention, a cable having a plurality of units or groups of twisted pairs of wires is made in one operation directly from twisted pairs and with a distribution pattern of the pairs which varies continuously in a non-repetitive manner throughout the length of the cable. All the pairs of wires which are to be cabled together are fed toward a cabling apparatus and those which are to form each unit or group are directed to their proper relative location with respect to the other units. Prior to cabling the units together the wires of each unit are subjected to a reverse twisting operation about the axis of the unit at a different and varying length to produce a random lay of the wires in the completed cable. This may be accomplished for example by passing the pairs of each group or unit being fed to the cabling apparatus through a separate face plate having a perforation for each pair and oscillating the several face plates independently of each other at rates which vary slightly in a random manner. One very convenient way of attaining the random rate of oscillation is to drive each face plate with a separate direct current motor as explained in more detail below.

Other objects and advantages will be apparent from the following detailed description when considered in conjunction with the accompanying drawings wherein:

Fig. 1 is a schematic top plan view of the apparatus;

Fig. 2 is a fragmentary wiring diagram for the individual motors for the oscillating units;

Fig. 3 is a vertical sectional view of one of the oscillating units and its motor drive;

Fig. 4 is a front elevational view of a face plate of one of the oscillating units, and Figs. 5 and 6 are schematic illustrations of certain of the groups of wires which may be employed in forming a cable.

In Fig. 1 the heavy lines 10 represent, schematically, supply stands. In the present instance, 26 reels containing pairs of wires are supported for each heavy line (supply stand) to supply their wires as desired in forming a cable core 11. Lines 12 represent the groups of 26 pairs of wires being directed to units 14. The units 14 are similar in structure to that shown in Fig. 3, the only difference being in the inherent differences of the driving motors. Returning to Fig. 1, lines 15 represent the groups of 26 pairs of wires after random lays have been produced therein by the oscillating units 14. The random lay groups 15 are directed to a stationary unit 16 where they are received in their respective spaced positions through a face plate (not shown) and are twisted together through the action of a take up unit 17. The take up unit 17 supports a reel 18 which is driven by a mechanism 19 to wind the cable core 11 thereon while at the same time the housing 20 for the take up unit is rotated by a motor drive 21 to produce the desired twist of the random lay groups of wires in the cable core.

The novel feature of the cable is the presence of random group lay therein and the feature of the apparatus for producing this result is the individual driving of the units 14 by direct current motors. In Fig. 3 the unit 14 includes a main member 22 supported by bearings 23 and having its entrance end 24 flared outwardly and recessed to receive a face plate 27. The face plate 27 has, in the present instance, twenty-six bushing-like guides 28 for the twenty-six pairs of wires 12 received from the supplies 10. The exit end of the main member 22 has a sleeve 29 mounted therein, removably held in place by a thumb screw 30. A forming die 31 mounted in the sleeve 29 has an outwardly flared entrance end 32 to receive the pairs of wires 12 and form them into a circular group. The bearings 23 are supported in a housing 34 mounted on a support 35. The housing 34 carries a spindle 36 for an idler sprocket 37. A sprocket 38 is secured to the exit end of the main member 22 and is connected by a chain 39 to a sprocket 40 on an output shaft 41 of a speed reducing unit 42. A direct current motor 43 drives the speed reducing unit 42 to drive, through the intermediate connecting means, the face plate 27. The box type structure 45 represents a suitable means for binding the group of wires 15 together. This structure is not shown in detail as it per se is not a part of the present invention. A suitable roller 46 is positioned at the exit end of this structure to guide its respective group of wires to the unit 16.

In one embodiment of the invention, as illustrated schematically in Fig. 1, there are 16 of the units 14, shown in detail in Fig. 3. These units may be identical in structure, with the exception of the motors 43, furthermore, the motors may be commercially identical units made to the same specifications and nearly alike as possible. As is well known, however, a group of such motors driven from the same power source will not operate at exactly the same speeds nor will they respond in exactly the same way to variations in load. The power required to drive the various face plates will not be exactly the same and will vary slightly from time to time. Hence, for these and other reasons the several face plates will be oscillated at slightly different rates. The relative orientation of the several face plates will therefore be changing constantly and due to the many factors determining their oscillation rates the distribution of the wire pairs in the cable will vary in a random manner.

The wiring diagram shown in Fig. 2 is a fragmentary portion of the entire wiring arrangement for the 16 motors in that only a portion for two of the motors is shown. Lines 50 and 51 supply the direct current energy for motors 43–A and 43–B and their respective field windings 52 and 53. The field windings of all of the motors are connected to lines 51 through a variable resistance 54. The armatures of all of the motors are connected to the supply lines 50 through reversing contactors 55 operated by a single switch 56 on each unit 14. In Fig. 3 the switch 56 is mounted for engagement with and actuation by removable screws 57 and 58, mounted in the main member 22 of the oscillating unit. Their functions, as a result of their spaced positions from each other are to determine the degree of oscillation of the unit 14. In the present illustration they are disposed 180° apart assuring 180° oscillation of each unit. Other adjustments may be made by varying the relative positions of the screws 57 and 58.

Considering the operation of the apparatus to produce the cable with the random group lay, let it be assumed that all of the operating units of the apparatus have been rendered effective, including the take up 17, to advance the completed cable core 11 on to the take up reel 18 and that the motors 43 have been energized. Regardless of the positions of the switch actuating screws 57 and 58 with respect to the switches 56 at the time the motors 43 are energized, the differences inherent in the operating characteristics of the direct current motors 43 will produce oscillation of the units 14 at slightly different speeds to produce a continuous change in the formation of the lays of the groups of wires. If for example, the units 14 were all in the position shown in Fig. 3 where the screw 57 is ready to reverse the switch 56 to cause reversal in the switches 55 for all of the motors 43 at the beginning of the cable forming operation, before the screw 58 of any one of the units operates its switch 56 there will be a variation in the positions of these screws 58 with respect to their switches 56 due to the differences in the speeds of their motors 43. These differences need be only very slight since they are cumulative and the initial cross-sectional arrangement of pairs begins to change immediately in a non-repetitive manner so that no two successive cross-sections of the cable are identical.

A typical cross-section of the cable is shown in Fig. 5. One pair of wire is shown in each unit to indicate the orientation of the unit and the instantaneous direction of oscillation of each unit is indicated. If another section is taken along the cable even at a point where all the face plates are rotating in the same directions as before the orientation of the various units will be different as indicated in Fig. 6, and the pairs in adjacent units which formerly were close together in inductive relation will be relatively remote from each other. With this constant shifting in the relative positions of the various pairs in different units the inductive difficulties between pairs of different units are substantially balanced out.

If wider variations in the random lays in the groups of wires are required variable resistance unit 60 may be disposed in the motor circuits and set at different values to increase the inherent differences in the motor speeds as required.

One of the important advantages of the present invention is that by making it possible to form a complete cable in one operation, all of the former expense incident to the use of a number of the different types of units is entirely eliminated.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming a cable comprising a take up operable to twist multiple groups of wires together to form a core and to advance longitudinally wires of which the groups are formed, an oscillator for the wires of each group having guides initially guiding the wires in each group at separately spaced positions, and an individual motor drive unit for each oscillator reversible to drive the oscillators at different rates to produce random lays of the groups of wires.

2. An apparatus for forming a cable comprising a take up operable to twist multiple groups of wires together to form a core and to advance longitudinally wires of which the groups are formed, an oscillator for the wires of each group having guides initially guiding the wires in each group at separately spaced positions, a separate direct current motor drive unit for driving each oscillator, and separate control circuits for each motor unit to cause random reversals of the motor units to produce random group lays of the wires.

3. An apparatus for forming a cable comprising a take up operable to twist multiple groups of wires together to form a core and to advance longitudinally wires of which the groups are formed, an oscillating head for the wires of each group, a die carried by each head to force the wires for its unit closely together, a face plate having spaced guides for the wires mounted in each head spaced from the die, and a separate reversible motor for driving each oscillating head to cause random back-and-forth lay of the wires of the groups whereby the relative orientation of the wires in the groups will vary in non-repetitive manner throughout the length of the cable.

References Cited in the file of this patent

UNITED STATES PATENTS

| | | |
|---|---|---|
| Re. 23,281 | Giffin | Oct. 10, 1950 |
| 278,289 | Strohm | May 22, 1883 |
| 491,109 | Holman | Feb. 7, 1893 |
| 1,988,586 | Deacon | May 7, 1931 |
| 2,317,113 | Reichelt et al. | Apr. 20, 1943 |
| 2,790,299 | Gillis et al. | Apr. 30, 1957 |